(No Model.)
J. D. NIX.
PITMAN FOR SICKLES OF HARVESTING AND MOWING MACHINES.
No. 263,424. Patented Aug. 29, 1882.
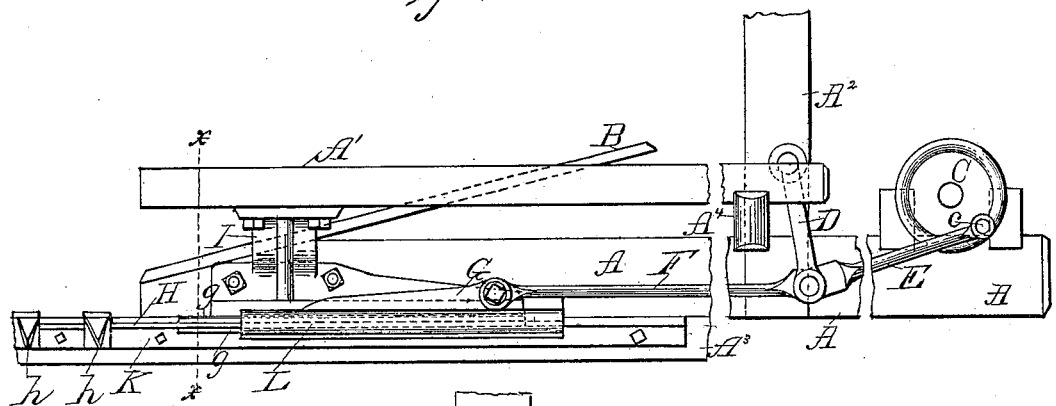
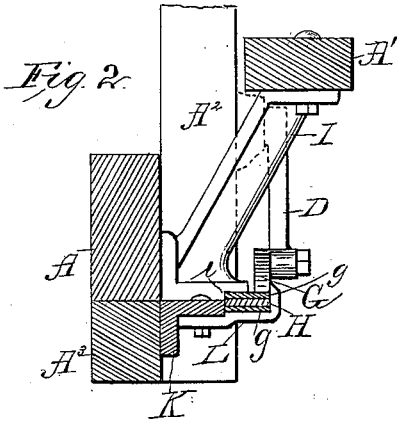
Witnesses:
Inventor:
John D. Nix,
By
Stout & Underwood
Attorneys.

UNITED STATES PATENT OFFICE.

JOHN D. NIX, OF MILWAUKEE, WISCONSIN.

PITMAN FOR SICKLES OF HARVESTING AND MOWING MACHINES.

SPECIFICATION forming part of Letters Patent No. 263,424, dated August 29, 1882.

Application filed July 24, 1882. (No model.)

*To all whom it may concern:*

Be it known that I, JOHN D. NIX, of Milwaukee, in the county of Milwaukee, and in the State of Wisconsin, have invented certain new and useful Improvements in Pitmen for Sickles of Harvesting and Mowing Machines; and I do hereby declare that the following is a full, clear, and exact description thereof.

My invention relates to the pitman-connections of sickles in harvesting and mowing machines; and it consists in a device whereby the said pitman may travel in a nearly horizontal line by means of an intermediate connection between the outer end of the pitman and the wrist-pin, as will be more particularly set forth hereinafter.

In the drawings, Figure 1 is a side elevation of a portion of a machine embodying my invention, and Fig. 2 is a cross section on the line $x\ x$ of Fig. 1, drawn to an enlarged scale.

$A\ A'\ A^2\ A^3\ A^4$ represent portions of the frame of the machine.

B is the table or platform.

C is the crank which communicates motion to the pitman, and $c$ the wrist-pin on said crank. I have shown the part C in the form of a wheel; but it is obvious that a simple crank-arm could be substituted therefor without departing from the spirit of my invention.

D is a pivoted hanger, suspended from the upright $a^2$, and E is a link, pivoted at one end to the said hanger and at the other end to the wrist-pin $c$.

F is the pitman or connecting-rod, one end of which is pivoted to the said hanger D, while its other end is pivoted to the upper extension of the sliding block G, which has two flat friction-plates, $g\ g$, between which one end of the sickle H is placed, being rigidly bolted thereto. The sickle H and fingers $h\ h$ are of ordinary construction, calling for no especial description. The beam A' of the frame is supported in the position shown by the transverse beam $A^4$ at one end, and at the other end by the bracket I, bolted to the said beam A' and to the beam A, and the base of said bracket is just above the sickle-bar K, to which the fingers $h\ h$ and the sliding-block guide L are bolted. The base of the bracket I is recessed or cut away, as shown at $i$ in Fig. 2, and between this recess $i$ and the projecting portions of the part L the sliding block G, bearing the sickle, is guided in its reciprocations.

The operation of my device will be fully understood from the foregoing description of its construction.

Heretofore in most harvesting and mowing machines the pitman or connecting-rod which actuates the sickle has been pivoted directly to the wrist-pin, and hence the said pitman had a considerable up-and-down motion in addition to its necessary reciprocations, and thus caused undue wear and tear to the guides in which the sickle moved. In my device the motion of the pitman is nearly horizontal by reason of the interposition of the hanger and link between the pitman and wrist-pin, and I thereby gain freedom from unnecessary friction, and hence secure easy and swift motion without injury to the machine.

Having thus described my invention, what I claim as new, and desire to secure by Letters Patent, is—

1. In a harvesting or mowing machine, the combination of the pitman or connecting-rod which operates the sickle and the wrist-pin of a crank which actuates the pitman with an intermediate hanger and link, whereby the reciprocation of the said pitman will be in a nearly horizontal line, as set forth.

2. In combination with the frame-work and sickle of a harvesting or mowing machine, the pitman F, hanger D, link E, crank C, and wrist-pin $c$, as and for the purpose set forth.

3. In a harvesting or mowing machine, the bracket I, recessed at its base, as shown at $i$, in combination with the sickle-bar K, guide L, and sliding block G, carrying the sickle H, arranged and adapted to operate as set forth.

In testimony that I claim the foregoing I have hereunto set my hand on this 24th day of June, 1882, in the presence of two witnesses.

JOHN D. NIX.

Witnesses:
HAROLD G. UNDERWOOD,
CARL PICKHART.